Patented Oct. 19, 1943

2,332,320

UNITED STATES PATENT OFFICE 2,332,320

TREATMENT OF STARCH

Ralph Waldo Kerr, Riverside, Ill., assignor to Corn Products Refining Company, New York, N. Y., a corporation of New Jersey No Drawing. Application July 20, 1939, Serial No. 285,615

12 Claims. (Cl. 127—71)

This invention relates to the treatment of starch, more particularly corn (maize) starch, to give it certain desired characteristics, when used for example in canning or soup-making; and one of the principal objects of the invention is to provide a method of treating corn starch, whereby it will be made substantially free from bacteria or other micro-organisms (referred to herein, collectively, as bacteria) including themophylic bacteria—organisms which resist high temperatures—which method of treatment, however, will neither thin the starch, to any considerable extent, that is, reduce its hot paste viscosity substantially below that of ordinary raw starch, nor, on the other hand, will it make the starch unduly thick boiling, that is, increase its hot paste viscosity to too large an extent; some thickening of the starch, however, being ordinarily desirable, and possible according to the present invention. Generally speaking, it is the purpose of the invention to so treat the corn starch that substantially all bacteria, including thermophylic bacteria, will be destroyed, but under such conditions that the sterilized starch will have a hot paste viscosity, measured by the Scott test (to be specified below), of about 85–200. The Scott index for raw, untreated starch, is in the neighborhood of 80–90, depending upon manufacturing conditions and the character of the corn from which the starch is derived which may vary considerably.

The starch according to the present invention is treated in suspension in water with free chlorine in regulated amounts and at temperatures and for periods of time which are also carefully regulated.

It has been common to treat starch by protracted heating, in a dry state in dextrine cookers, at high temperatures, for example, at 245° F. for 33 hours, for the purpose of sterilization; but such treatment makes corn starch definitely "thin boiling" and hence unsuitable for use in soup making and other similar processes in which the starch is used primarily as a thickening and suspending agent.

It has also been known to use chlorine, in the form of hypochlorite, as a sterilizing agent for starch, but only under conditions which bring about excessive thinning. If enough of the hypochlorite is used to bring about the destruction of the thermophylic bacteria. In fact, treatment with hypochlorite is one of the recognized methods of making thin boiling starches.

On the other hand, the applicant's United States Patent No. 2,108,862, February 22, 1938, for "Halogenated thick boiling starch," discloses a process of treating starch with chlorine gas which might bring about sterilization (see particularly Example 1, page 2, left column, line 9); but this process results in such a high Scott starch—500 to 1000—as to make the product quite unsuitable for the purposes of the present invention, for example, as a thickener for soups and the like. The object, in fact, of the invention of the patent was to very greatly increase the thick boiling character of the starch.

A further object of the present invention is to treat starch, and more particularly the starch made free from thermophylic bacteria (referred to hereinafter as "thermophylic free starch"), by the method of the present invention, so that the starch when cooked under pressures substantially above atmospheric pressure, for example, at fifteen pounds pressure per square inch for forty minutes, as is customary in the manufacture of soups, will not lose its thick boiling character, although its Scott may be somewhat reduced. That is, all commercially made corn starches, and to a considerably larger extent such starches when sterilized in accordance with the present invention, when cooked under the high pressures customary in the manufacture of soups, will become thin boiling, that is, will have a Scott less than that of raw starch. This appears to be due to the development under conditions of pressure cooking of acidic substances or compounds, or other substances or compounds acting as acids act on the starch, (which will be referred to as "acidic substances") these hydrolyzing substances tending to bring about the thinning of the starch at the relatively high temperatures and pressures existing during pressure cooking. Apparently, in the case of a chlorine treated starch, some of the chlorine becomes chemically attached to the starch molecule so as to be incapable of removal by the ordinary neutralizing or anti-chlor agents. Under pressure cooking conditions this residual chlorine is released and it or its compounds, the hydrochloric acid for example, produces the thinning action upon the starch referred to.

In accordance with this phase of the present invention of the starch, preferably after treatment for the destruction of thermophylic bacteria, has blended therewith a small quantity of a neutralizing agent or buffer, of a non-deleterious character from the food standpoint, which, when the starch is pressure cooked acts to inhibit the thinning action upon the starch of the released chlorine or its compounds, or other substances of acidic character, which may be thus split off from the starch. The amount of the neutralizing agent is, of course, too small to react substantially with the starch.

This expedient might be used with other chlorinated starches or, in fact, with any starch, since all starches when subjected to pressure cooking develop acidic substances which act, under the conditions of the pressure cooking operation, to thin the starch.

Corn from which starch is made contains a number of different types of bacteria which contaminate the starch. Some of these bacteria are destroyed by the relatively high temperatures in the starch drying kilns. It is the practice in canning and soup making operations to heat the food substances for brief periods of time during the packing operation to temperatures of 225°–250° F. However, there are bacteria in starch which resist these high temperature conditions and are consequently known as thermophylic bacteria.

In accordance with the present invention it is possible to produce a starch freer from thermophylic bacteria than starch treated by any of the previous methods heretofore employed for sterilization; and to do so by procedures which avoid the thinning of the starch that has been a primary objection to former sterilization methods. The National Canners' Association's specification for canners' starch, in respect to the presence of bacteria, is that 10 grams of the starch must not contain over 125 spores of bacteria. The starch produced according to the present invention contains less than this number of spores and may therefore be referred to as thermophylic free starch.

As illustrating the first phase of the invention, the procedure for sterilizing the starch without reduction of hot paste viscosity, two somewhat different procedures are given below. One involves the use of chlorine gas with which the starch suspension is treated in a chlorinating tower. The other process employs a hypochlorite, preferably, sodium hypochlorite, and is intended to be used where a chlorinating tower is not available. However, in the second process the conditions are such that the chlorine exists and acts upon the starch as free chlorine; the process being carried out at such relatively low pH as to insure this. The action of the hypochlorite on starch is specifically different from the action thereon of free chlorine. The hypochlorite acts, apparently, more rapidly in respect to the thinning tendency, but to obtain the same sterilizing effect more of the hypochlorite is necessary, measured in the terms of available chlorine. If the hypochlorite is used, sterilization can be effected, but only at the expense of some thinning of the starch. Therefore, if the hypochlorite method is used, which convenience may require, the chlorination process should be carried out, in order to get the best results, at such low pH that substantially all the available chlorine is in a free state and as such acts upon the starch.

The Scott test herein referred to for thick boiling starches is as follows:

15 grams of the 12% moisture starch to be tested is mixed with 280 cc. of distilled water at room temperature. The beaker containing the mixture is put into a boiling water bath and stirred constantly for five minutes by means of a mechanical agitator rotating at 200 revolutions per minute. At the end of five minutes the beaker is covered with a watch glass and the contents allowed to boil for another period of five minutes. At the end of ten minutes the watch glass is removed, the condensate is drained back and the material stirred, at the above rate the draining and stirring taking ten seconds. The watch glass is put back on the beaker, and the mixture allowed to boil for one minute and fifty seconds or until twelve minutes time has elapsed. The watch glass is removed, the condensate is drained back into the beaker and contents stirred, these operations taking fifteen seconds. At the end of twelve minutes and fifteen seconds, elapsed time, the contents of the beaker is transferred to a Scott cup, described below, and at the end of fifteen minutes, total elapsed time, the plunger valve of the cup is withdrawn, allowing the paste to pass into a graduated cylinder arranged below the cup. The Scott index for any given paste is the number of seconds required for the delivery of 50 cc. of the starch paste from the cup. The Scott cup is a cup or funnel having a discharge tube in the bottom about 3.175 mm. long with an orifice about 1.588 mm. in diameter which is closed by a plunger valve. The orifice is adjusted as to diameter on the basis of a master cup. The average commercially made, non-modified corn starch, when tested as above, has a Scott between 85 and 90.

The following specific examples will illustrate the reduction to practice of the invention. It is understood that these examples are purely illustrative and informative. The intention is to cover all modifications within the scope of the appended claims.

*Example 1—Production of thermophylic free starch by means of chlorinating tower*

31,600 pounds of second American filter starch (dry starch basis) is mixed with enough water to make a suspension of 8000 gallons at 22° Baumé. This quantity of starch liquor is passed through a chlorinating tower in 80 minutes in contact with chlorine gas introduced into the tower at the rate of 1.25 pounds of chlorine per 100 gallons of starch liquor per minute. This is equivalent to 0.31% of chlorine based upon the weight of the starch. The chlorinated starch is run into a tank and agitated for 10 minutes and then allowed to stand for 70 minutes. The purpose of allowing the chlorinated starch milk to stand without agitation is to prevent contamination with bacteria from the air.

The batch is then agitated for 10 minutes sufficiently to re-suspend the starch.

The average time of the starch in the chlorinating tower is 40 minutes. Adding to this the two agitation periods of 10 minutes each and a quiescent period of 70 minutes, the total treating time may be considered as 130 minutes.

During the time of treatment the temperature of the liquor is at 95°–105° F. This, in fact, is the common temperature range for starch factory liquors. If necessary, heat may be added to keep the liquor within this temperature range.

After the chlorination treatment has been completed as above described, there is added to the liquor sulfur dioxide, preferably in the form of sodium bisulfite, to give the finished starch an $SO_2$ content of 0.005%. The $SO_2$ is an anti-chlor and neutralizes or drives out the free chlorine.

The starch is then neutralized to the usual pH of 5.2 by the addition of soda ash or other common neutralizing agent.

The liquor is then dewatered and the solid material washed on a suitable filter, for example, a vacuum starch washing filter, the pipings of which have been pre-sterilized with calcium hypochlorite liquor. The washed starch is then dried. It will have a Scott of about 110.

The Scott, depending somewhat on the character of the corn and the process of obtaining starch therefrom and also upon variations in operating conditions, as given above, to wit, quantity of chlorine and temperature and time of treatment may vary between 85 and 200. Compared with the chlorination treatment in patent No. 2,108,862 the temperature is lower, the quantity of chlorine much less but the length of treatment considerably greater. Generally speaking, the operating ranges will be: quantity of chlorine 0.165% to 0.55% by weight on dry starch; time 50 to 180 minutes; temperature 95° to 105° F. To effect sterilization and to insure giving the starch an approximate Scott, say of 110, a change in the amounts specified in Example 1 in one of the controlling factors, viz., quantity of chlorine, time and temperature, requires a corresponding change in the opposite sense of one or both of the other factors. To raise the Scott above 110, either the temperature may be decreased or the amount of chlorine or the length of treatment may be increased but within the limits of the above stated ranges. To lower the Scott the temperature may be raised or the quantity of chlorine or chlorinating time decreased within such ranges. Similarly to obtain a strictly thermophylic free starch, as defined herein, within the specified Scott range of 85 to 200 if the minimum amount of chlorine as given in said chlorine range is used, it is necessary to use substantially the maximum length of treatment specified. With the amount of chlorine increased over the minimum, the length of treatment can be correspondingly decreased.

Free chlorine apparently acts in three ways upon the starch material. It destroys bacteria but this requires a rather protracted treatment; it reacts directly with the starch to thicken it; and it forms an acid with the water in which the starch is suspended, hypochlorous acid with perhaps some hydrochloric acid, which tends to thin the starch. This invention, referring to the phase of it now under consideration, is based on the discovery that with a proper regulation of quantity of chlorine, time and temperature the process may be controlled so as to give full scope to the sterilizing effect of the chlorine while preventing its usual thinning action, in fact, the process can be and is preferably regulated so as to permit the thickening function of the chlorine to be effective, but to a limited extent only.

*Example 2—Thermophylic free starch by the sodium hypochlorite process*

A 22 Baumé liquor is made from 1000 pounds of second American filter starch on dry substance basis. To this is added a sufficient amount of acid, for example, hydrochloric acid, to give the starch liquor a pH of 3. To this mixture is added a sodium hypochlorite solution close to pH 7 and containing 2.5 pounds of available chlorine (1.65 to 5.5 based on dry starch). This reduces the pH to 1.5, at which hydrogen ion concentration the available chlorine is substantially all in the form of free chlorine. The starch milk thus treated is agitated for 180 minutes (50 to 180) at a temperature of 100° F. (95°–105° F.). As the available chlorine in the sodium hypochlorite, at the pH specified, is in the form of free chlorine, the result is that the starch treated in accordance with the process of Example 2 is under substantially the same conditions as the starch treated in accordance with Example 1.

The chlorinated starch milk is then treated with enough sodium bisulfite so that the filtrate shows a sulfur dioxide content of 0.01% (0.005% to 0.01%). This neutralizes the free chlorine. Caustic soda, or other common neutralizing agent, is added to give the finished starch a pH of 5.2 (5.0–6.0). The starch is then dewatered and washed on the usual starch washing filter and is dried in a kiln or other suitable drying apparatus.

The product has been found to be a thermophylic free starch having a Scott of 110 which may be varied within the Scott range of 85–200, by varying the controlling factors of chlorine, time and temperature.

Sodium hypochlorite could be used, as such, for the sterilization of starch, that is, under pH conditions in which the sodium hypochlorite compound has not been destroyed and wherein the chlorine exists in the form of available chlorine instead of as free chlorine; but the starch under these conditions would be unduly thinned. The available chlorine in sodium hypochlorite acts more rapidly on the starch than does free chlorine, in respect to the thinning function of the chlorine, which reduces the amount of chlorine to act as the sterilizing agent and this necessitates the use of an increased quantity of the hypochlorite. This makes it very difficult with the hypochlorite to bring about proper sterilization without unduly thinning the starch. Moreover, this use of a considerably larger quantity of the hypochlorite is undesirable for economic reasons.

*Example 3—Treatment of the starch to prevent thinning under pressure cooking*

With 100 parts by weight of powdered thermophilic free starch made in accordance either with Example 1 or Example 2, is blended 2 parts of di-sodium phosphate, or enough di-sodium phosphate to maintain the hydrogen ion concentration at a pH of 5.1 (5.0–5.2) while the starch is cooked with water for 40 minutes at 15 pounds pressure per square inch.

Starch so treated, when it is cooked under pressure as described, will thin somewhat but the Scott will not be reduced substantially below 70.

Any edible powdered neutralizer having a buffering effect similar to the buffering effect of di-sodium phosphate could be used for example, sodium bicarbonate, ammonium bicarbonate or sodium acetate.

Apparently the tendency of ordinary commercial raw starch to become thin by cooking under pressure is due to the presence of sulfur dioxide, fatty acids, silicic acid and phosphoric acid which are to a considerable extent chemically bound to or otherwise associated with the starch molecule, but are released under the conditions of high pressure cooking so that they have the customary hydrolyzing effect of acidic matter on the starch when the latter is heated in the presence of water, and particularly when heated under pressures considerably above atmospheric pressure.

If commercial starch be chlorinated, as for example, to sterilize the starch in accordance with the present invention, there are other substances of acidic character in the starch which are not neutralized by the ordinary neutralizing operations following chlorination. These additional acidic substances are probably chloro-fatty acids produced by the reaction of chlorine with the unsaturated fatty acid portion of the fatty acid of the starch; hydrochloric acid produced by the interaction of chloro-fatty acids with hot water; and carboxylic acid groups (COOH) produced by the oxidizing action of chlorine on the starch molecule. The more important acidic materials liberated from the starch during the cooking operation are the chloro-fatty acids. These, as well as any other acidic material present, are neutralized by the di-sodium phosphate or other buffer incorporated with the starch.

Whether the above statements are altogether correct or not, the fact is that, in case of ordinary commercial starches and particularly in the case of chlorinated starches, the starch contains acidic substances, or substances capable of forming acids which substances are developed into thinning agents by the conditions of pressure cooking, so that they have a thinning power which they did not have before; and, as applicant has discovered, this thinning action may be inhibited, to a considerable extent, at least, by means of a buffering substance of basic character that can be blended with the starch so as to become effective when the thinning agents are developed.

I claim:

1. Process for the production of a thermophylic free starch which comprises: treating the starch in suspension in water at a temperature of about 95°–105° F. for fifty to one hundred and eighty minutes, with an amount of free chlorine whereby substantially all thermophylic bacteria are destroyed; and giving the material an antichlor treatment to stop reaction between the chlorine and the starch.

2. Process for the production of a thermophylic free starch which comprises: treating starch, in suspension in water, with about 0.31% free chlorine, based on weight of starch, for about 130 minutes at a temperature of about 100° F. and giving the material an antichlor treatment to stop the reaction between the chlorine and the starch.

3. Process for the production of a thermophylic free starch which comprises: passing a water suspension of starch at a temperature of 95°–105° F. through a chlorinating tower into which chlorine gas is introduced in quantity of 0.165%–0.55% by weight of the starch dry basis; collecting the chlorinated starch liquor in a tank; agitating the liquor and afterwards allowing it to stand quiescently; and after the chlorine has been in contact with the liquor for 180–50 minutes introducing an antichlor into the liquor; and filtering and drying the starch.

4. Process for the production of a thermophylic free starch which comprises: introducing into a water suspension of starch, sodium hypochlorite containing 0.165%–0.55% available chlorine; reducing the pH of the starch liquor to a point at which substantially all of the chlorine is in the form of free chlorine; maintaining the liquor at a temperature of 95°–105° F.; and after the chlorine has been in contact with the starch for 180–50 minutes, giving the material an antichlor treatment to stop the reaction between the chlorine and the starch and filtering and drying the starch.

5. Process of minimizing the thinning, when cooked, of chlorinated starch containing chloro-fatty acids, which comprises: introducing into the starch a basic substance in sufficient amount to neutralize said chloro-fatty acids during the cooking operation.

6. Process of minimizing the thinning, when cooked, of chlorinated starch containing chloro-fatty acids, which comprises: introducing into the starch a small amount of di-sodium phosphate sufficient to neutralize said chloro-fatty acids during the cooking operation.

7. Process of minimizing the thinning, when cooked, of chlorinated starch containing fatty acids, which comprises: introducing a basic material in sufficient amount to neutralize acidic substance developed by the cooking.

8. Process of minimizing the thinning, when cooked, of starch which comprises: introducing into the starch a small quantity of a basic substance, which does not react with the starch, and which is sufficient in amount to neutralize acidic material associated with the starch and liberated when the starch is cooked.

9. Process for the production of a thermophylic free starch having a Scott range of 85–200 which comprises treating corn starch in suspension in water, at a temperature of 95°–105° F., with 0.165% to 0.55% of free chlorine, by weight of the starch, for 180 to 50 minutes; and then giving the material an antichlor treatment to stop the reaction between the chlorine and the starch.

10. Dry starch compound comprising: chlorinated starch having acidic material associated therewith; and blended with the starch a small quantity of an edible neutralizing agent, of basic character, in amount sufficient to maintain the pH of the starch at about 5.0–5.2 when the starch is cooked for about 40 minutes at about 15 pounds pressure per square inch, whereby the degree of thinning of the starch during cooking is reduced.

11. A dry starch compound comprising: chlorinated starch containing combined chlorine; and blended with the starch a small quantity of an edible neutralizing agent, of basic character, in amount sufficient to maintain the starch at a pH of about 5.0–5.2, when the starch is cooked, whereby the degree of thinning of the starch during cooking is reduced.

12. Process for the production of a thermophylic free corn starch which comprises: treating the starch in suspension in water at a temperature of about 95°–105° F. for fifty to one hundred and eighty minutes, with an amount of free chlorine whereby substantailly all thermophylic bacteria are destroyed, and the product has a hot paste viscosity within the Scott test range of 85–200; and giving the material an antichlor treatment to stop the reaction between the chlorine and the starch.

RALPH WALDO KERR.